United States Patent
Bayrakdar et al.

(10) Patent No.: US 9,249,694 B2
(45) Date of Patent: Feb. 2, 2016

(54) RADIAL CAMSHAFT PRESSURE MEDIUM TRANSFER

(71) Applicant: Schaeffler Technologies GmbH & Co. KG, Herzogenaurach (DE)

(72) Inventors: Ali Bayrakdar, Roethenbach/Pegnitz (DE); Joachim Dietz, Frensdorf (DE); Gerhard Scheidig, Oberasbach (DE); Andreas Strauss, Forchheim (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 14/405,119

(22) PCT Filed: Jul. 9, 2013

(86) PCT No.: PCT/DE2013/200030
§ 371 (c)(1),
(2) Date: Dec. 2, 2014

(87) PCT Pub. No.: WO2014/029391
PCT Pub. Date: Feb. 27, 2014

(65) Prior Publication Data
US 2015/0144082 A1 May 28, 2015

(30) Foreign Application Priority Data
Aug. 23, 2012 (DE) .......................... 10 2012 214 963

(51) Int. Cl.
*F01M 1/06* (2006.01)
*F01L 1/344* (2006.01)
*F16C 41/00* (2006.01)
(Continued)

(52) U.S. Cl.
CPC .............. *F01L 1/3442* (2013.01); *F16C 33/38* (2013.01); *F16C 33/586* (2013.01); *F16C 41/005* (2013.01); *F01L 2001/0476* (2013.01); *F16C 19/06* (2013.01)

(58) Field of Classification Search
CPC ... F01L 1/3442; F01L 2001/0476; F16C 19/06; F16C 33/38; F16C 33/586
USPC ................................. 123/90.16, 90.17, 90.34
See application file for complete search history.

(56) References Cited

U.S. PATENT DOCUMENTS 5,794,578 A    8/1998  Strauss et al.
7,640,902 B2 * 1/2010  Knecht ................. F01L 1/3442
                                                        123/90.15
(Continued)

FOREIGN PATENT DOCUMENTS

DE    195 25 837    1/1997
DE    196 45 688    5/1998
(Continued)

*Primary Examiner* — Ching Chang
(74) *Attorney, Agent, or Firm* — Davidson, Davidson & Kappel, LLC

(57) ABSTRACT

A camshaft unit includes a camshaft having a radial channel, a hydraulic phase setting device communicating with the radial channel for adjusting the phase length of the camshaft with respect to a crankshaft via hydraulic pressure medium and a pressure medium channel embodied as a solid cylinder head component. To transfer a pressure medium, at least one pressure medium transfer element is formed between the pressure medium channel and the radial channel. The pressure medium transfer element includes a ring channel including a ring channel opening extending in the peripheral direction of the ring channel and including a radial channel opening leading into a radial channel and opposite the ring channel opening. The pressure medium channel communicates with the radial channel via the ring channel opening and the radial channel opening.

13 Claims, 9 Drawing Sheets

(51) Int. Cl.
   *F16C 33/38* (2006.01)
   *F16C 33/58* (2006.01)
   *F16C 19/06* (2006.01)
   *F01L 1/047* (2006.01)

(56) References Cited

U.S. PATENT DOCUMENTS

2003/0116110 A1 6/2003 Kohrs et al.
2003/0179966 A1 9/2003 Hojo et al.
2004/0042698 A1 3/2004 Yamamoto et al.
2005/0196084 A1 9/2005 Kitahara et al.
2008/0187259 A1 8/2008 Ishigo et al.

FOREIGN PATENT DOCUMENTS

| DE | 199 30 711 | 8/2000 |
| DE | 10 2006 0106 | 9/2007 |
| DE | 10 2007 0460 | 4/2008 |
| EP | 1 510 709 | 3/2005 |
| EP | 1 785 637 | 5/2007 |

* cited by examiner

RADIAL CAMSHAFT PRESSURE MEDIUM TRANSFER

The present invention relates to a camshaft assembly.

BACKGROUND

Camshafts are used in valve train assemblies of internal combustion engines for the purpose of controlling the opening and/or closing of inlet valves and/or outlet valves in a targeted manner. The camshaft is driven by a crankshaft.

Adjustment of the phase angle of the camshaft with respect to the crankshaft may take place with the aid of a hydraulic phase setting device, which is placed, for example, in the camshaft and which is supplied with a hydraulic pressure medium such as motor oil, for example via the oil pump of the internal combustion engine. Pressure medium-conducting channels may be formed in the camshaft for the purpose of supplying the hydraulic phase setting device with the hydraulic pressure medium.

Publication EP 2 326 804 B1 describes a camshaft assembly, in which a hydraulic phase setting device is supplied with pressure medium via a radial channel in the camshaft.

SUMMARY OF THE INVENTION

It is an object of the present invention to provide a preferably installation space-saving option for transferring the pressure medium from a pressure medium channel in a stationary component to at least one rotatable or rotating radial channel of a camshaft for a camshaft which includes at least one radial channel whose phase angle with respect to a crankshaft is adjustable with the aid of a hydraulic pressure medium, using a hydraulic phase setting device.

The present invention provides a camshaft assembly, in which at least one pressure medium transfer element is formed between a pressure medium channel provided in a cylinder head-affixed component and the at least one radial channel of the camshaft, the pressure medium transfer element including at least one annular channel, which has an annular channel opening extending in the circumferential direction of the annular channel and at least one radial channel opening opposite the annular channel opening and emptying into a radial channel. The pressure medium channel communicates with the at least one radial channel of the camshaft via the annular channel opening and the at least one radial channel opening of the at least one annular channel of the at least one pressure medium transfer element. This has the advantage that a pressure medium transfer from a stationary pressure medium channel to a rotatable or rotating radial channel of the camshaft may be implemented easily, reliably and in an installation space-saving manner.

The camshaft assembly may include, for example, both one pressure medium transfer element of this type and two or possibly more pressure medium transfer elements of this type. If two or more pressure medium transfer elements are provided between the pressure medium channel and the at least one radial channel of the camshaft, in particular, which each include at least one annular channel which has an annular channel opening extending in the circumferential direction of the annular channel and at least one radial channel opening opposite the annular channel opening of the particular pressure medium transfer element and emptying into a radial channel, the pressure medium channel may communicate with the at least one radial channel of the camshaft via the annular channel openings and the radial channel openings of the annular channels of the pressure medium transfer elements. The pressure medium transfer elements may communicate with each other via the annular channel openings and radial channel openings of their annular channels. In particular, annular channels of different pressure medium transfer elements may empty into each other or be situated for example opposite each other, in particular directly adjacent to each other, and be situated, for example opposite each other, in particular directly adjacent to each other. If two or more pressure medium transfer elements are provided, they may have the specific pressure medium transfer element embodiments described below and, for example, have the same or a different design.

A cylinder head-affixed component may be understood, in particular, to be a component which is immovably situated on the cylinder head. This component may be, for example, the cylinder head, a cylinder head cover, a crankcase, a chain case or an ancillary component connected to these components.

Communicating may be understood to be a direct pressure medium transfer as well as an indirect pressure medium transfer, for example via one or multiple additional, for example interposed, openings, channels and/or components.

The hydraulic phase setting device may be designed, for example, as a vane-type adjuster.

For example, the hydraulic phase setting device may communicate with the at least one radial channel of the camshaft via the interior of the camshaft. For example, the hydraulic phase setting device may be situated at least partially in the camshaft or its interior.

The camshaft may be supported by a rolling bearing. The rolling bearing may include, in particular, a rolling bearing inner ring, a rolling bearing outer ring and a rolling bearing ball cage. Either the rolling bearing inner ring may be designed to be rotatable and the rolling bearing outer ring to be stationary, or the rolling bearing inner ring may be designed to be stationary and the rolling bearing outer ring to be rotatable. The rolling bearing ball cage ring may be designed to be both stationary and rotatable or to be loosely or floatingly mounted. Within the scope of one special embodiment, the hydraulic pressure medium is conductible through at least one component of the rolling bearing. The rolling bearing, for example the rolling bearing inner ring and/or the rolling bearing outer ring and/or the rolling bearing ball cage, may include at least one channel for conducting a hydraulic pressure medium.

In principle, a pressure medium transfer element may be integrated into an independent component or an independent component arrangement as well as into a component of the camshaft assembly, for example into the camshaft, into the cylinder head-affixed component and/or into the rolling bearing.

Within the scope of one specific embodiment, the pressure medium transfer element or the pressure medium transfer elements include(s) at least one radial channel which, in particular, empties into a radial channel opening of at least one annular channel of the (particular) pressure medium transfer element.

If the pressure medium transfer element is integrated into the camshaft, the at least one radial channel of the camshaft may simultaneously be the at least one radial channel of the pressure medium transfer element. Or if the pressure medium transfer element is integrated, for example, into the cylinder head-affixed component, the pressure medium channel may simultaneously be the at least one radial channel of the pressure medium transfer element.

The pressure medium transfer element may include both one annular channel and two or more annular channels. It is also possible for the pressure medium transfer element to include two or possibly more radial channels.

The pressure medium transfer element or the pressure medium transfer elements preferably include(s) at least one annular channel having a radially outer annular channel opening and, in particular, at least one radially inner radial channel opening and/or at least one annular channel having a radially inner annular channel opening and, in particular, at least one radially outer radial channel opening.

The terms outer and inner refer to the particular annular channel, the term radial also referring to the rotationally symmetrical axis of the particular annular channel or also to the rotation axis of the camshaft or the rolling bearing.

Within the scope of one preferred specific embodiment, the pressure medium transfer element or the pressure medium transfer elements include(s) at least one annular channel having a radially outer annular channel opening. In particular, the annular channel may have at least one radially inner radial channel opening.

Within the scope of one special embodiment, the pressure medium transfer element or the pressure medium transfer elements include(s) at least one annular channel having a radially outer annular channel opening and, in particular, at least one radially inner radial channel opening, an annular channel having a radially inner annular channel and, in particular, at least one radially outer radial channel opening, as well as at least one radial channel which connects the annular channel having the radially outer annular channel opening to the annular channel having the radially inner annular channel opening. The at least one radial channel may empty, in particular, into the at least one radial inner radial channel opening of the annular channel having the radially outer annular channel opening and into the at least one radially outer radial channel opening of the annular channel having the radially inner annular channel opening. The annular channel having the radially outer annular channel opening and, in particular, the at least one radially inner radial channel opening may be, for example, an annular channel which is formed with the radially inner annular channel opening and the at least one radially outer radial channel opening radially outward from the annular channel, it being possible to refer to the annular channel having the radially outer annular channel opening as the outer annular channel and the annular channel having the radially inner annular channel opening as the inner annular channel.

This embodiment has the advantage, on the one hand, that it may be situated, loosely or floatingly supported, for example between the camshaft and the cylinder head-affixed component or between the rolling bearing inner ring and the rolling bearing outer ring, the pressure medium transfer element, due to the annular channels, both facilitating a pressure medium transfer between a stationary and a rotating component and not requiring an angle-oriented alignment with respect to a radial channel of the camshaft or the pressure medium channel or the rolling bearing inner ring or the rolling bearing outer ring.

On the other hand, if this embodiment is connected to the camshaft or to the cylinder head-affixed component or to the rolling bearing, or if it is integrated therein, this has proven to be advantageous, since the pressure medium transfer element facilitates a pressure medium transfer between a stationary component and a rotating component via the one annular channel and may be fastened via the surface having the other annular channel, without taking into account an angle-oriented alignment, whereby the mounting may be advantageously simplified.

It is furthermore possible that the camshaft assembly has two or more pressure medium transfer elements of this type. For example, one of the pressure medium transfer elements may be connected to the camshaft or to a rotatable rolling bearing ring, and the other pressure medium transfer element may be connected to the cylinder head-affixed component or to a stationary rolling bearing ring or be integrated therein. An annular channel of the rotatably situated pressure medium transfer element facilitates a pressure medium transfer to an annular channel of the stationary pressure medium transfer element. For example, the radially inner annular channel opening of the annular channel of the one pressure medium transfer element may be situated opposite, in particular directly adjacent to, the radially outer annular channel opening of the annular channel of the other pressure medium transfer element. The pressure medium transfer elements may be (each) advantageously fastened via the surfaces in which the annular channel openings of the two other annular channels of the pressure medium transfer elements are provided, without having to take into account an angle-oriented alignment, which also has an advantageous effect on the mounting (see FIG. 8).

The pressure medium transfer element (or the pressure medium transfer elements) may be, in particular, an annular component or an annular component arrangement.

Within the scope of one special embodiment, the pressure medium transfer element or the pressure medium transfer elements include(s) an annular base body in the form of an annular U profile or H profile having an essentially axially oriented profile middle section, at least one radial channel extending through the profile middle section. The at least one radial channel may be designed, for example, in the form of a continuous material recess, for example a bore. Due to the profile middle section and two profile side sections connected thereto, one annular channel may be provided in the case of a U profile or two annular channels may be provided in the case of an H profile. This embodiment has the advantage, on the one hand, that the pressure medium transfer element may be easily manufactured. On the other hand, an annular base body designed in this way may simultaneously function as a compression seal, as explained in detail below.

A U profile may be understood to be, in particular, a profile having an essentially U-shaped cross-sectional surface. An H profile may be understood to be, in particular, a profile having an essentially H-shaped cross-sectional surface. Essentially may be understood to mean, in particular, that, to the extent that the lateral sections of the cross-sectional surface have a similar, in particular radial, extension to one another, the intermediate profile middle section may have shape deviations and may be provided, for example, with a wavy design. A wavy design of the profile middle section has the advantage that a compression seal and/or another annular groove and/or seal receptacles may be provided thereby (see FIGS. 2 and 6).

Within the scope of another special embodiment, the pressure medium transfer element or the pressure medium transfer elements include(s) an annular base body, in which the at least one annular channel is formed in the form of an annular groove, at least one radial channel, which empties into the at least one annular groove-shaped annular channel, extending through the annular base body. The at least one radial channel may be designed, for example, in the form of a continuous material recess, for example a bore, which empties into the at least one annular groove-shaped annular channel. In particular, two annular channels in the form of annular grooves may be formed in the annular base body, at least one radial channel, which empties into the two annular groove-shaped annular channels, extending through the annular base body.

The annular base body may be made of metal or plastic, in the case of a design as a profile as well as in the case of a design as a component having an annular groove. For example, the annular base body may be a formed part, a cast part or a turned part. For example, the annular base body may be a metal sheet, for example a sheet metal ring, or a metal or plastic cast part.

For the purpose of sealing the pressure medium transfer system, the pressure medium transfer element or the pressure medium transfer elements may be equipped, for example, with sealing rings and/or be designed as compression seals and/or be provided with one or multiple clearance fits.

Within the scope of one specific embodiment, the pressure medium transfer element or the pressure medium transfer elements (each) include(s) at least two sealing rings, which extend, in particular essentially in parallel, to the two sides of an annular channel. In particular, the annular base body may have two sealing ring receptacles formed on both sides of an annular channel, for example in the form of annular indentations, for accommodating the sealing rings.

If the annular base body has two annular channels and is fixedly connected to another component via a surface having an annular channel, or if it is integrated therein, it is possible to provide sealing rings or sealing ring receptacles only on the two sides of one of the annular channels, namely the annular channel formed in an unconnected surface.

If the annular base body has two annular channels and is a loosely or floatingly supported component or a loosely or floatingly supported component arrangement, it is possible to provide two sealing rings or sealing ring receptacles on both sides of both annular channels, i.e., a total of at least four sealing rings or sealing ring receptacles.

Within the scope of another alternative or additional specific embodiment, the annular base body of the pressure medium transfer element itself functions as a compression seal, the annular base body being pressable against an adjacent component to be sealed with respect to the annular base body for the purpose of achieving a sealing effect upon the application of pressure medium and, if necessary, upon deformation of the annular base body. The component to be sealed, for example the cylinder head-affixed component, or the camshaft or the rotatable or stationary rolling bearing ring, may have a compression seal contact and/or accommodating section, which, if necessary, is also used for the purpose of, in particular, radial and/or axial stabilization of the position of the annular base body or for the blocking thereof.

Within the scope of another alternative or additional specific embodiment, the pressure medium transfer element or the pressure medium transfer elements, in particular its/their annular base body, is/are sealed against one or multiple adjacent components to be sealed with respect to the (particular) pressure medium transfer element or annular base body, with the aid of one or multiple clearance fits.

The pressure medium channel may also be a radial channel, in particular with respect to the rotation axis of the camshaft.

In principle, it is possible to fasten the pressure medium transfer element or the pressure medium transfer elements in an angle-oriented manner. To dispense with an angle-oriented mounting, it may, however, be advantageous to provide one or multiple additional (mounting) annular channels and/or one or multiple additional (mounting) radial channels, for example having radial channel openings which are enlarged axially and/or in the circumferential direction. Due to the additional (mounting) annular channels and/or (mounting) radial channels, mounting tolerances may advantageously be compensated for and the mounting simplified thereby. For example, at least one additional (mounting) annular channel and/or (mounting) radial channel, for example having radial channel openings which are enlarged axially and/or in the circumferential direction, may be provided between a radial channel of the pressure medium transfer element and a radial channel of the camshaft or between a radial channel of the pressure medium transfer element and the pressure medium channel or between the pressure medium transfer element and a radial channel of the rolling bearing, for example, or of the rolling bearing inner ring and/or the rolling bearing outer ring and/or of the rolling bearing ball cage ring. Via the at least one additional (mounting) annular channel and/or (mounting) radial channel, the radial channel of the pressure medium transfer element may empty indirectly into the radial channel of the camshaft, or the radial channel of the pressure medium transfer element may empty indirectly into the pressure medium channel, or the radial channel of the pressure medium transfer element may empty indirectly into the radial channel of the rolling bearing, for example of the rolling bearing inner ring and/or of the rolling bearing outer ring and/or of the rolling bearing ball cage ring. The at least one additional (mounting) annular channel and/or (mounting) radial channel may be formed, for example, in the pressure medium transfer element and/or the camshaft and/or the cylinder head-affixed component and/or the rolling bearing, for example the rolling bearing inner ring and/or the rolling bearing outer ring and/or the rolling bearing ball cage ring.

Within the scope of one specific embodiment, the camshaft assembly includes a pressure medium transfer element which is, in particular, rotatably fixedly connected to the camshaft or to the rolling bearing inner ring or is integrated therein, for example the pressure medium transfer element is, in particular, rotatably fixedly connected to the camshaft or the rolling bearing inner ring or is integrated therein. The pressure medium transfer element may be fastened, for example to an outer lateral surface of the camshaft or the rolling bearing inner ring or be integrated therein. With respect to the cylinder head-affixed component, the pressure medium transfer element may be, in particular, rotatably supported. The pressure medium channel may empty into an annular channel of the pressure medium transfer element via an annular channel opening, in particular radially or directly or, for example, indirectly via another (mounting) radial channel and/or (mounting) annular channel. The at least one radial channel of the pressure medium transfer element may empty into the at least one radial channel of the camshaft, in particular, radially, for example directly or, for example, via another radial channel and/or annular channel, or it may itself be the at least one radial channel of the camshaft.

Within the scope of another additional or alternative specific embodiment, the camshaft assembly includes a pressure medium transfer element which is, in particular, fixedly connected to the cylinder head-affixed component or to the rolling bearing outer ring or is integrated therein, or the pressure medium transfer element is, in particular, fixedly connected to the cylinder head-affixed component or the rolling bearing outer ring or is integrated therein. The pressure medium transfer element may be fastened, for example to an inner lateral surface of the cylinder head-affixed component or of the rolling bearing outer ring, or it may be integrated therein. The pressure medium transfer element may be situated, in particular, in a stationary manner with respect to the camshaft. The at least one radial channel of the camshaft may empty into an annular channel of the pressure medium transfer element via an annular channel opening, in particular radially, for example directly or, for example, indirectly via another (mounting) radial channel and/or (mounting) annular channel. The at least one radial channel of the pressure medium transfer element may empty into the pressure medium channel, in particular radially, for example directly or, for example, indirectly via another radial channel and/or annular channel, or it may itself be the pressure medium channel.

It is also possible to fasten the, for example, one pressure medium transfer element to the rolling bearing ball cage ring, in particular to an axial surface of the rolling bearing ball cage ring, or to integrate it therein. The pressure medium transfer element may then be supported in a stationary or rotatable or loose/floating manner as a function of the rolling bearing ball cage.

Within the scope of another specific embodiment, the camshaft assembly includes a pressure medium transfer element which is situated and/or floatingly supported, for example, between the cylinder head-affixed component or the rolling bearing outer ring and the rolling bearing inner ring or the camshaft, or the pressure medium transfer element is situated, for example, between the cylinder head-affixed component or the rolling bearing outer ring and the rolling bearing inner ring or the camshaft, and/or it includes a loosely or floatingly supported component or a loosely or floatingly supported component arrangement. The pressure medium transfer element may include, in particular, two annular channels which are connected to each other via at least one radial channel. The pressure medium channel may empty into one of the annular channels of the pressure medium transfer element, in particular radially, for example directly, or for example indirectly via another radial channel and/or annular channel, and the at least one radial channel of the camshaft emptying into the other annular channel of the pressure medium transfer element, in particular radially, for example directly or, for example, indirectly via another radial channel and/or annular channel.

The camshaft assembly unit may include a pressure medium transfer element which, as explained above, is fastened, integrated or situated/floatingly supported.

For example, the pressure medium transfer element may be loosely or floatingly supported between the rolling bearing inner ring and the rolling bearing outer ring, or it may be fastened to the rolling bearing inner ring or to the rolling bearing outer ring or to the rolling bearing ball cage or integrated therein.

The rolling bearing inner ring and the rolling bearing outer ring may (each) have a radial channel. The radial channel of the rolling bearing inner ring may communicate with the radial channel of the rolling bearing outer ring via the pressure medium transfer element, in particular via the at least one annular channel and radial channel of the pressure medium transfer element. On the other hand, the radial channel of the rolling bearing inner ring may communicate with the radial channel of the camshaft or the radial channel of the rolling bearing outer ring. In particular, the radial channel of the rolling bearing inner ring may empty into the radial channel of the camshaft, in particular radially, for example directly or indirectly, for example via another (mounting) annular channel and/or (mounting) radial channel having radial channel opening(s) which is/are enlarged, for example, in the circumferential direction and/or axially. The radial channel of the rolling bearing outer ring may empty into the pressure medium channel, in particular radially, for example directly or indirectly, for example via another (mounting) annular channel and/or (mounting) radial channel having radial channel opening(s) which is/are enlarged, for example, axially and/or in the circumferential direction. The additional (mounting) annular channel and/or (mounting) radial channel may have, for example, an opening formed in an inner lateral surface of the rolling bearing inner ring or in an outer lateral surface of the rolling bearing outer ring. For example, the additional (mounting) annular channel and/or (mounting) radial channel may be formed in the rolling bearing inner ring radially inwardly of the radial channel of the rolling bearing inner ring or in the rolling bearing outer ring radially outwardly of the radial channel of the rolling bearing outer ring.

However, it is also possible, for example, that the camshaft assembly includes two pressure medium transfer elements which are fastened or integrated as explained above. For example, the camshaft assembly may include a pressure medium transfer element fastened to the camshaft or integrated therein and a pressure medium transfer element fastened to the cylinder head-affixed component or the rolling bearing outer ring or the rolling bearing ball cage ring or integrated therein, or a pressure medium transfer element fastened to the rolling bearing inner ring or integrated therein and a pressure medium transfer element fastened to the cylinder head-affixed component or the rolling bearing outer ring or the rolling bearing ball cage ring or integrated therein, or a pressure medium transfer element fastened to the rolling bearing ball cage ring or integrated therein and a pressure medium transfer element fastened to the cylinder head-affixed component or the rolling bearing outer ring or integrated therein. In particular, both pressure medium transfer elements may each have an annular channel having a radially outer annular channel opening and, in particular, at least one radially inner radial channel opening, an annular channel having a radially inner annular channel opening and, in particular, at least one radially outer radial channel opening as well as at least one radial channel which connects the annular channel having the radially outer annular channel opening of the rolling bearing inner ring to the annular channel having the radially inner annular channel opening of the rolling bearing inner ring. The radially outer annular channel opening of the annular channel of the one pressure medium transfer element may be situated opposite, in particular directly adjacent to, the radially inner annular channel opening of the annular channel of the other pressure medium transfer element.

Within the scope of one special embodiment, the at least one pressure medium transfer element is situated in the rolling bearing, in particular fastened or loosely or floatingly supported and/or integrated into at least one component of the rolling bearing. For example, the pressure medium transfer element or the pressure medium transfer elements may be fastened to the rolling ball cage ring and/or the rolling bearing inner ring and/or the rolling bearing outer ring and/or integrated into the rolling ball cage ring and/or the rolling bearing inner ring and/or the rolling bearing outer ring. At least one rolling bearing component, for example the rolling ball cage ring and/or the rolling bearing inner ring and/or the rolling bearing outer ring, may include at least one annular channel and, if necessary, at least one radial channel and thereby be itself used as a pressure medium transfer element. As explained above in connection with the pressure medium transfer element, the at least one annular channel of the rolling bearing component may include an annular channel opening extending in the circumferential direction of the annular channel and, in particular, at least one radial channel opening opposite the annular channel opening and emptying into a radial channel.

The rolling bearing, in particular the rolling bearing inner ring and/or the rolling bearing outer ring and/or the rolling bearing ball cage, may include at least one annular channel having a radially outer annular channel opening and, in particular, at least one radially inner radial channel opening and/or at least one annular channel having a radially inner annular channel opening and, in particular, at least one radially outer radial channel opening. The rolling bearing, in particular the rolling bearing inner ring and/or the rolling bearing outer ring and/or the rolling bearing ball cage, may include at least one annular channel having a radially outer annular channel opening and, in particular, at least one radially inner radial channel opening, an annular channel having a radially inner annular channel opening and, in particular at least one radially outer radial channel opening as well as at least one radial channel which connects the annular channel having the radially outer annular channel opening to the annular channel having the radially inner annular channel opening. The at least one radial channel may empty, in particular into the at least one radial inner radial channel opening of the annular channel having the radially outer annular channel opening and into the at least one radially outer radial channel opening of the annular channel having the radially inner annular channel opening. The annular channel having the radially outer annular channel opening and, in particular, the at least one radially inner radial channel opening may be, in particular, an annular channel which is provided with the radially inner annular channel opening and, in particular, the at least one radially outer radial channel opening radially outward from the annular channel, it being possible to refer to the annular channel having the radially outer annular channel opening as the outer annular channel and the annular channel having the radially inner annular channel opening as the inner annular channel.

Within the scope of one particularly special embodiment, the rolling bearing inner ring includes an annular channel having a radially outer annular channel opening and, in particular, at least one radially inner radial channel opening, an annular channel having a radially inner annular channel opening and, in particular, at least one radially outer radial channel opening as well as at least one radial channel which connects the annular channel having the radially outer annular channel opening of the rolling bearing inner ring to the annular channel having the radially inner annular channel opening of the rolling bearing inner ring, in particular the at least one radial channel of the rolling bearing inner ring emptying into the at least one radially inner radial channel opening of the annular channel having the radially outer annular channel opening of the rolling bearing inner ring and into the at least one radially outer radial channel opening of the annular channel having the radially inner channel opening of the rolling bearing inner ring.

The rolling bearing outer ring also includes an annular channel having a radially outer annular channel opening and, in particular, at least one radially inner radial channel opening, an annular channel having a radially inner annular channel opening and, in particular, at least one radially outer radial channel opening as well as at least one radial channel which connects the annular channel having the radially outer annular channel opening of the rolling bearing outer ring to the annular channel having the radially inner annular channel opening of the rolling bearing outer ring, in particular the least one radial channel of the rolling bearing outer ring emptying into the at least one radially inner radial channel opening of the annular channel having the radially outer annular channel opening of the rolling bearing outer ring and into the at least one radially outer radial channel opening of the annular channel having the radially inner channel opening of the rolling bearing outer ring.

The radially outer annular channel opening of the annular channel of the rolling bearing inner ring is situated opposite, in particular directly adjacent to, the radially inner annular channel opening of the annular channel of the rolling bearing outer ring.

A sealing of the pressure medium transfer system may take place within the rolling bearing, in particular with the aid of one or multiple clearance fits, in particular with the aid of at least one clearance fit between the rolling bearing inner ring and the rolling bearing outer ring.

BRIEF DESCRIPTION OF THE DRAWING

The present invention is explained by way of example below on the basis of preferred exemplary embodiments with reference to the appended drawings, the features illustrated below being able to represent one aspect of the present invention both individually and in combination.

DETAILED DESCRIPTION OF THE INVENTION

Figure 1:
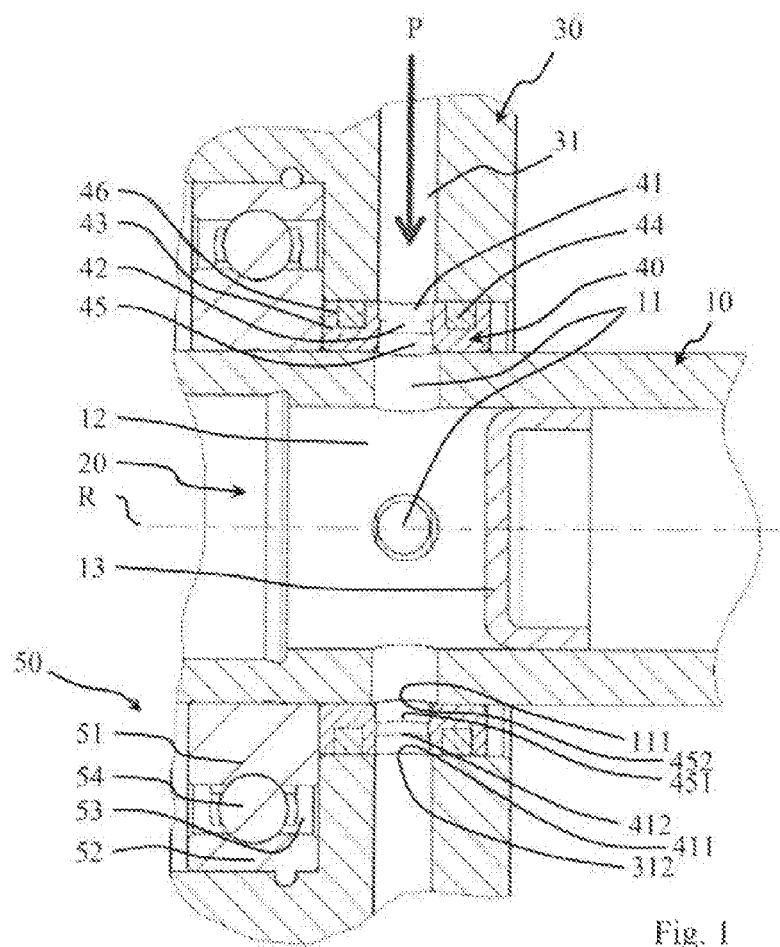
FIG. 1 shows a schematic cross section of a first specific embodiment, which includes a pressure medium transfer element having an annular base body fastened to the camshaft, with two annular grooves as well as sealing rings.

FIGS. 1 through 9 show camshaft assemblies which include a camshaft 10 and a hydraulic phase setting device 20 for adjusting the phase angle of camshaft 10 with respect to a crankshaft with the aid of a hydraulic pressure medium P. Camshaft 10 includes multiple radial channels 11, which communicate with phase setting device 20 via the interior 12 of camshaft 10. At least one part of phase setting device 20 is situated inside camshaft 10. Camshaft 10 has an essentially tube-shaped design. Interior 12 is delimited by phase setting device 20, on the one hand, and by a closing element 13, on the other hand.

Camshaft 10 is rotatably supported around a rotation axis R with respect to a cylinder head-affixed component 30 via a rolling bearing 50. At least one part of camshaft 10 projects into cylinder head-affixed component 30.

Rolling bearing 50 includes a rolling bearing inner ring 51, a rolling bearing outer ring 52 and a rolling bearing ball cage ring 53 situated therebetween, with rolling bearing balls 54 accommodated therein. Rolling bearing inner ring 51 is, in particular, rotatably fixedly fastened to an outer lateral surface of camshaft 10 via an inner lateral surface of rolling bearing inner ring 51. Rolling bearing outer ring 52 is fastened to an inner lateral surface of cylinder head-affixed component 30 via an outer lateral surface of rolling bearing outer ring 52. Camshaft 10 and rolling bearing inner ring 51 are rotatable components, and rolling bearing outer ring 52 and cylinder head-affixed component 30 are stationary components. Rolling bearing ball cage ring 53 may be loosely or floatingly supported and situated, for example, between rolling bearing inner ring 51 and rolling bearing outer ring 52, secured only against an axial movement, and it may, if necessary, be rotatable together with a rotary motion of rolling bearing inner ring 51. Alternatively, rolling bearing ball cage ring 53 may be fastened either to rolling bearing inner ring 51 or to rolling bearing outer ring 52 or integrated therein.

Cylinder head-affixed component 30 includes a pressure medium channel 31 in the form of a radial channel, which extends radially outward from radial channels 11 of camshaft 10.

A pressure medium transfer element 40 (FIGS. 1 through 7, 9) or two pressure medium transfer elements 40, 40* (FIG. 8) is/are provided between pressure medium channel 31 and radial channels 11 of camshaft 10, which, depending on the specific embodiment, are integrated either as an independent component or an independent component arrangement or are partially or fully integrated into the camshaft 10, the cylinder head-affixed component and/or the rolling bearing 50.

Pressure medium transfer elements 40,40* each include one or multiple annular channels 41, 45, 41*, 45*, each of which has an annular channel opening 411, 452, 412*, 451* extending in the circumferential direction of annular channel 41, 45, 41*, 45*, and at least one radial channel opening 412, 451, 411*, 452* opposite annular channel opening 411, 452, 412*, 451*, which empties into a radial channel 42, 42*, 11. It is facilitated that pressure medium channel 31 communicates with radial channels 11 of camshaft 10 via annular channel opening 411, 452, 412*, 451* and the at least one radial channel opening 412, 451, 411*, 452* of annular channel(s) 41, 45, 41*, 45* of pressure medium transfer elements 40, 40*.

Within the scope of the description of FIGS. 1 through 9 detailed below, different specific embodiments of pressure medium transfer element 40 or pressure medium transfer elements 40, 40* are explained in greater detail.

Within the scope of the specific embodiment illustrated in FIG. 1, pressure medium transfer element 40 includes an annular base body 43, in which two annular channels 41, 45 in the form of annular grooves as well as multiple radial channels 42 are formed, radial channels 42 extending through annular base body 43 and emptying into both annular channels 41, 45.

The one annular channel 41 is radially outward of other annular channel 45, radial channel 42 extending radially between the two annular channels 41, 45. Radially outward annular channel 41 has a radially outer annular channel opening 411 and multiple radially inner radial channel openings 412. The other, in particular radially inner annular channel 45 has a radially inner annular channel opening 452 and multiple radially outer radial channel openings 451. Radial channels 42 each empty into the two annular channels 41, 45 via a radially inner radial channel opening 412, on the one hand, and via a radially outer radial channel opening 451, on the other hand.

Within the scope of the specific embodiment illustrated in FIG. 1, radial outer annular channel opening 411 of outer annular channel 41 is situated opposite, in particular directly adjacent to, a radially inner opening 312 of pressure medium channel 31. In this way, pressure medium channel 31 empties directly radially into radially outer annular channel opening 411 of outer annular channel 41 of pressure medium transfer element 40. Radially inner annular channel opening 452 of inner annular channel 45 is situated opposite, in particular directly adjacent to, radially outer openings 111 of radial channels 11 of camshaft 10. In this way, radial channels 11 of camshaft 10 empty directly radially into radially inner annular channel opening 452 of inner annular channel 45 of pressure medium transfer element 40. Since outer annular channel 41 of pressure medium transfer element 40 is connected to inner annular channel 45 of pressure medium transfer element 40 by radial channels 42 of pressure medium transfer element 40, it is thus made possible that, in particular stationary, pressure medium channel 31 communicates via both annular channels 41, 45 and radial channels 42 of pressure medium transfer element 40 with, in particular rotatable, radial channels 11 of camshaft 10 and, in turn, with hydraulic phase setting device 20 via these 11 radial channels as well as interior 12 of camshaft 10.

FIG. 1 furthermore shows that pressure medium transfer element 40 includes two sealing rings 44, which extend essentially in parallel to the two axially outer sides of outer annular channel 41. Sealing rings 44 are situated in sealing ring receptacles 46, which are formed in the form of annular indentations in the outer lateral surface of annular base body 43 of pressure medium transfer element 40 and which extend essentially in parallel to the two axially outer sides of outer annular channel 41. In the specific embodiment illustrated in FIG. 1, annular base body 40 is fastened to the outer lateral surface of camshaft 10 via its inner lateral surface. Due to the fixed connection, within the scope of this specific embodiment, additional sealing ring receptacles 46 and sealing rings 44 in the inner lateral surface of annular base body 43 may be dispensed with.

Alternatively to the specific embodiment illustrated in FIG. 1, it is also possible, in a similar specific embodiment, which is not illustrated, to situate the annular base body loosely or floatingly supported, in which case at least two sealing ring receptacles and sealing rings may also be formed in the inner lateral surface of the annular base body, which extend essentially in parallel to the two axially outer sides of the inner annular channel.

An alternative specific embodiment (not illustrated), which is similar to the specific embodiment illustrated in FIG. 1, is furthermore possible, in which, instead of the inner annular channel, the radial channels extend all the way to the inner lateral surface of the tubular base body, or in which, instead of the inner annular channel, additional radial channels extending to the inner lateral surface of the tubular base body are formed, which each empty radially into one of the radial channels of the annular base body which empty into the outer annular channel. Within the scope of these specific embodiments, the radial channels extending to the inner lateral surface of tubular base body 43 should be mounted in an angle-oriented manner and fastened opposite the radial channels of the camshaft, which may be dispensed with in the case of the specific embodiment illustrated in FIG. 1 due to annular groove 45. To simplify the assembly, even in a design of the pressure medium transfer element having radial channels which extend to the inner lateral surface of the annular base body, the radial channels extending to the inner lateral surface of the annular base body may include radial channel openings which—compared to the radial channel openings of the radial channels of the camshaft—are enlarged axially and/or in the circumferential direction.

Figure 2:
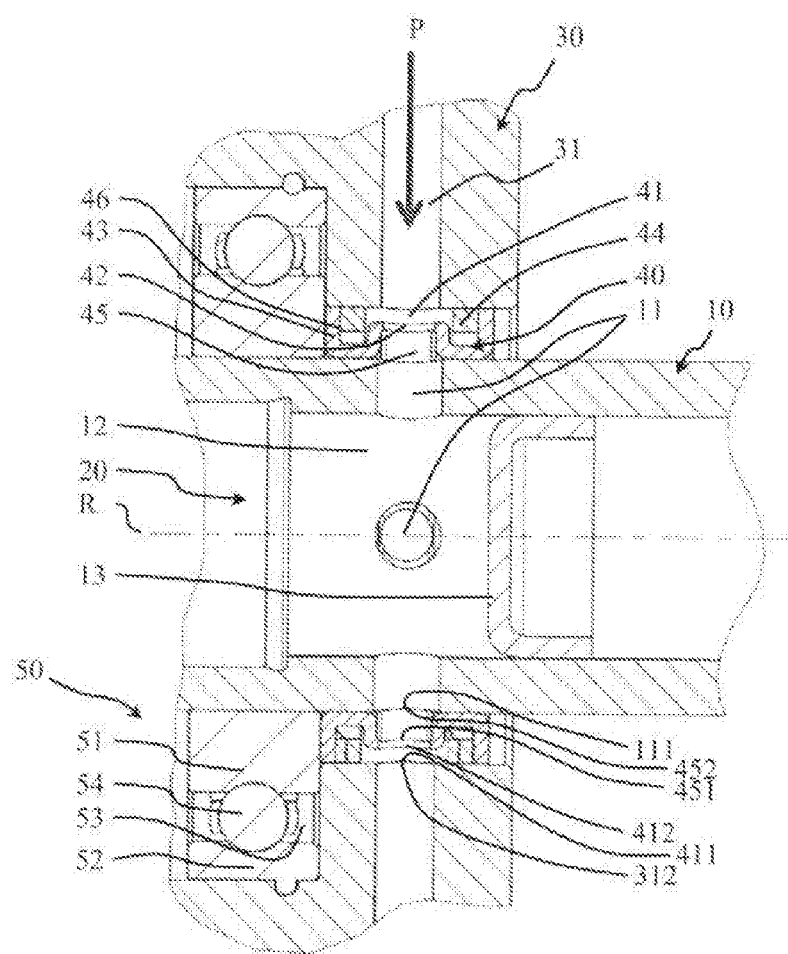
FIG. 2 shows a schematic cross section of a second specific embodiment, which includes a pressure medium transfer element having an annular base body fastened to the camshaft in the form of an annular U profile as well as having sealing rings.

The specific embodiment illustrated within the scope of FIG. 2 essentially differs from the specific embodiment illustrated in FIG. 1 by the fact that pressure medium transfer element 40 includes an annular base body 43 in the form of an annular U profile having an essentially axially oriented profile middle section and two profile side sections extending radially outward, radial channels 42 extending through the profile middle section.

FIG. 2 illustrates that "essentially" may be understood to mean, in particular, that—to the extent that the profile side sections of the cross-sectional surface have a similar, in particular radial, extension to each other—the intermediate profile middle section may have shape deviations and may have, for example, a wavy or bent design, as illustrated in FIG. 2.

Within the scope of the specific embodiment illustrated in FIG. 2, the profile middle section has, in particular, two lateral subsections, which are bent radially inwardly, and one subsection, which extends therebetween and is bent radially outwardly. Radial channels 42 extend through the subsection bent radially outwardly, the two lateral subsections bent radially inwardly being used as sealing ring receptacles 46. A profile having a cross section of this type may generally also be referred to as a W profile or an M profile, it being possible to view this as a special type of U profile.

An outer annular channel 41 is formed by the profile middle section and the two profile side sections connected thereto and extending radially outward, an inner annular channel 45 being formed by the two lateral subsections bent radially inwardly and the subsection of the profile middle section extending therebetween and bent radially outwardly.

Figure 3:
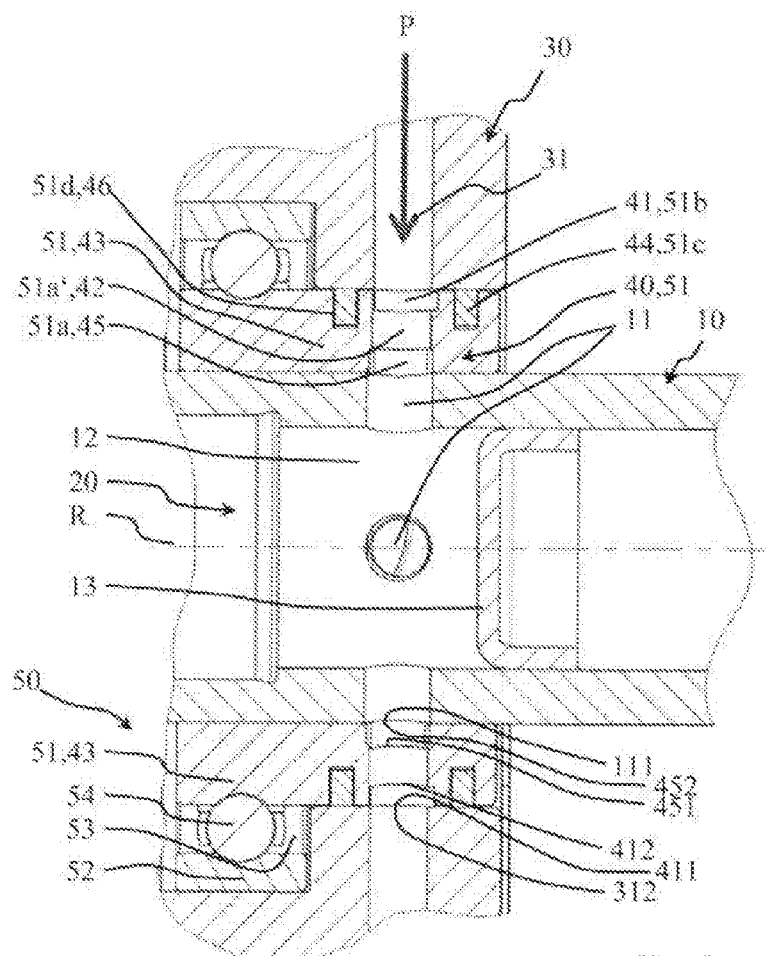
FIG. 3 shows a schematic cross section of a third specific embodiment, which includes a pressure medium transfer element integrated into the rolling bearing inner ring, with two annular grooves as well as sealing rings.

Within the scope of the specific embodiment illustrated in FIG. 3, rolling bearing 50, in particular rolling bearing inner ring 51, is designed to transfer hydraulic pressure medium P from a stationary component 30 to a rotatable component 10. The specific embodiment illustrated within the scope of FIG. 3 essentially differs from the specific embodiment illustrated in FIG. 1 due to the fact that pressure medium transfer element 40 is integrated into rolling bearing inner ring 51, in particular into the outer lateral surface of rolling bearing inner ring 51. Pressure medium transfer element 40 is formed, in particular, in a section of rolling bearing inner ring 51, which is axially elongated with respect to rolling bearing outer ring 52 and rolling bearing ball cage ring 53. Rolling bearing inner ring 51, 43 includes an outer annular channel 51b, 41 having a radially outer annular channel opening 411 and an inner annular channel 51a, 45 having a radially inner annular channel opening 452 as well as radial channels 51a', 42, which 51a', 42 connect annular channel 51b, 41 having radially outer annular channel opening 411 to annular channel 51a, 45 having radial inner annular channel opening 452. Moreover, rolling bearing inner ring 51, 43 includes sealing rings 51c, 44 and sealing ring receptacles 51d, 46, which extend essentially in parallel to both sides of outer annular channel 51b, 41. Rolling bearing inner ring 51 is thus used as a tubular base body 43 of pressure medium transfer element 40, its 51 annular channels 51a, 51b, radial channels 51a', sealing rings 51c and sealing ring receptacles 51d being used as annular channels 41, 45, radial channels 42, sealing rings 44 and sealing ring receptacles 46 of pressure medium transfer element 40.

Figure 4:
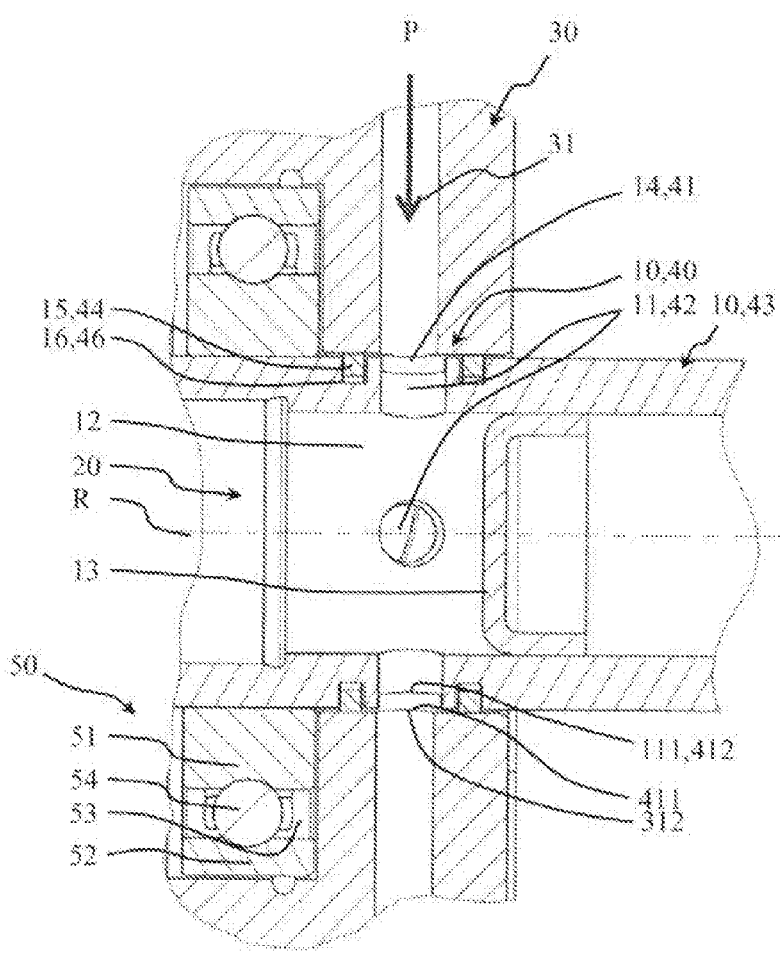
FIG. 4 shows a schematic cross section of a fourth specific embodiment, which includes a pressure medium transfer element integrated into the camshaft, with an annular groove as well as sealing rings.

Within the scope of the specific embodiment illustrated in FIG. 4, camshaft 10 itself is designed to transfer hydraulic pressure medium P from a stationary component 30 to a rotatable component 10. The specific embodiment illustrated within the scope of FIG. 4 essentially differs from the specific embodiment illustrated in FIG. 1 due to the fact that pressure medium transfer element 40 is integrated into camshaft 10, in particular into the outer lateral surface of camshaft 10, and only one outer annular channel 14, 41 is provided. Pressure medium transfer element 40 is formed, in particular, in a section of camshaft 10, in which radial channels 11 of camshaft 10 are also formed. Camshaft 10 includes an annular channel 14, 41 having a radially outer annular channel opening 411 and multiple radially inner radial channel openings 111, 412, via which radial channels 11, 42 of camshaft 10 empty radially into annular channel 14, 41 and are used both as radial channels 11 of camshaft 10 and as radial channels 42 of pressure medium transfer element 40. Moreover, camshaft 10 includes sealing rings 15, 44 and sealing ring receptacles 16, 46, which extend essentially in parallel to both sides of annular channel 14, 41. Camshaft 10 is thus used as a tubular base body 43 of pressure medium transfer element 40, its annular channel 14, radial channels 11, sealing rings 15 and sealing ring receptacles 16 being used as annular channel 41, radial channels 42, sealing rings 44 and sealing ring receptacles 46 of pressure medium transfer element 40.

Figure 5:
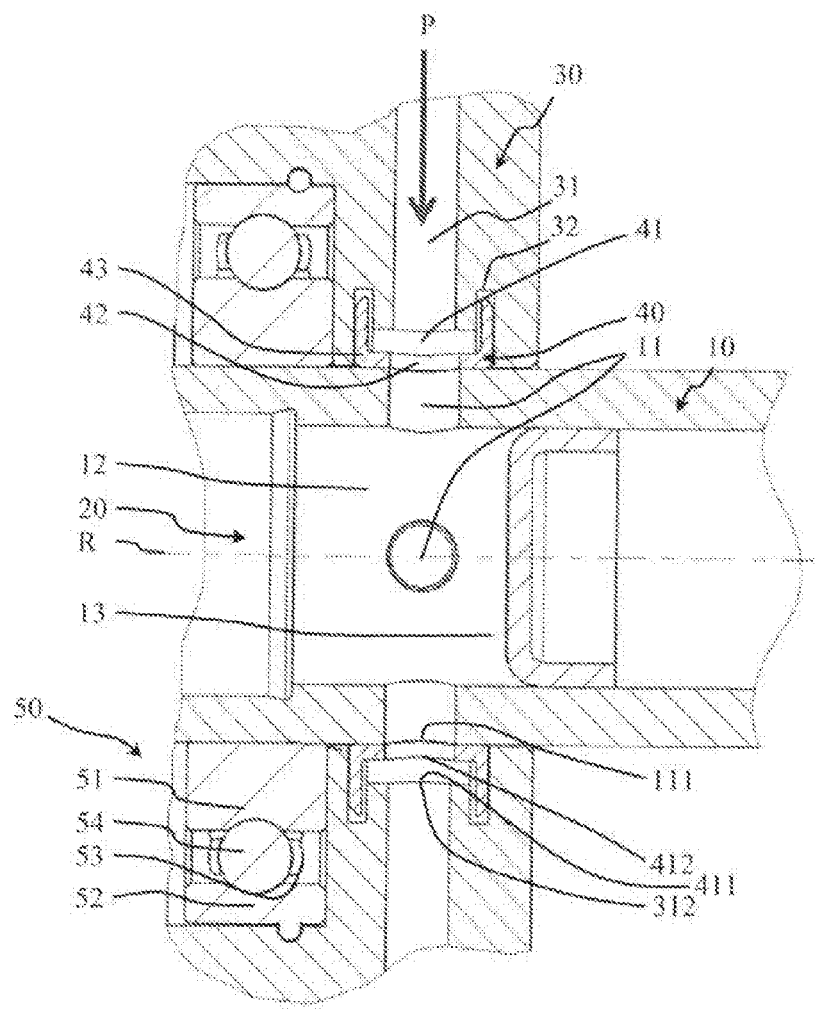
FIG. 5 shows a schematic cross section of a fifth specific embodiment, which includes a pressure medium transfer element having an annular base body fastened to the camshaft in the form of an annular U profile, which also functions as a compression seal.

The specific embodiment illustrated within the scope of FIG. 5 has in common with the specific embodiment illustrated in FIG. 2 the fact that pressure medium transfer element 40 includes an annular base body 43 in the form of an annular U profile having an axially oriented profile middle section and two profile side sections extending radially outward, radial channels 42 extending through the profile middle section. In contrast to the specific embodiment illustrated in FIG. 2, the profile middle section here, however, has an axially linear or planar and not a wavy design, for which reason annular base body 43 has only one outer annular channel 41 within the scope of the specific embodiment illustrated in FIG. 5. Moreover, in contrast to the specific embodiment illustrated in FIG. 2—instead of sealing rings—a compression seal is used for sealing the pressure medium transfer system, annular base body 43 of pressure medium transfer element 40 itself functioning as a compression seal. The sealing effect is achieved by the fact that the profile side sections are pressed against adjacent cylinder head-affixed component 30 to be sealed with respect to annular base body 43 upon the application of pressure medium. Cylinder head-affixed component 30 includes a compression sealing contact and accommodating section 32, against which the profile side sections of annular base body 43 are pressed upon the application of pressure medium. Annular base body 43 is fastened to the outer lateral surface of camshaft 10 via the inner lateral surface of the profile middle section.

Figure 6:
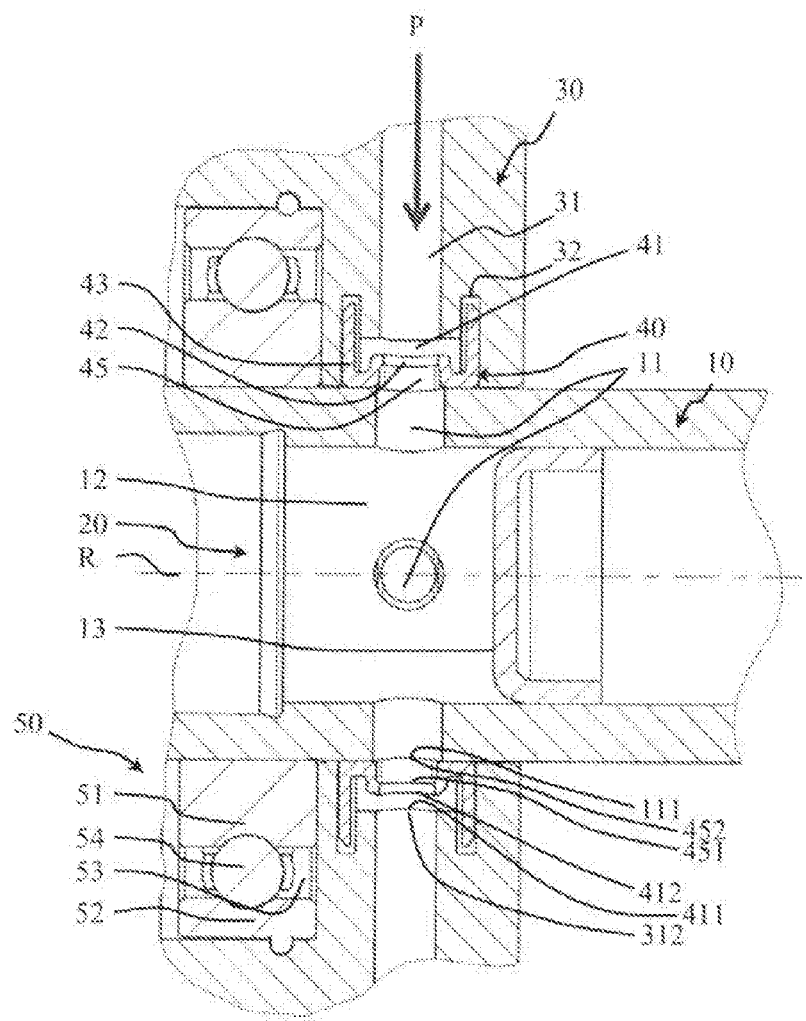
FIG. 6 shows a schematic cross section of a sixth specific embodiment, which includes a pressure medium transfer element having an annular base body, loosely or floatingly supported, in the form of an annular U profile, which also functions as a compression seal.

In contrast to the specific embodiment illustrated in FIG. 5, within the scope of the specific embodiment illustrated in FIG. 6, annular base body 43 is supported loosely or floatingly between camshaft 10 and cylinder head-affixed component 30. Within the scope of the specific embodiment illustrated in FIG. 6, the profile middle section is furthermore not axially linear or planar, as in the specific embodiment illustrated in FIG. 5, but rather only essentially axial, namely wavy, and designed similarly to the specific embodiment illustrated in FIG. 2, for which reason annular base body 43 within the scope of the specific embodiment illustrated in FIG. 6 has an outer annular channel 41 and an inner annular channel 45. Since annular base body 43 is situated in a loose or floatingly supported manner, its radial and axial positions are stabilized by compression sealing contact and accommodating section 32 of cylinder head-affixed component 30. Upon the application of pressure medium, not only the profile side sections are pressed against compression sealing contact and accommodating section 32, but the lateral subsections of the profile middle section, bent radially inwardly, are also pressed against the outer lateral surface of camshaft 10. Inner radial channel 45 of annular base body 43 makes it possible that a pressure medium transfer is ensured even when annular base body 43 rotates with respect to camshaft 10 and its radial channels 11 and, in particular, no angle orientation is required.

Figure 7:
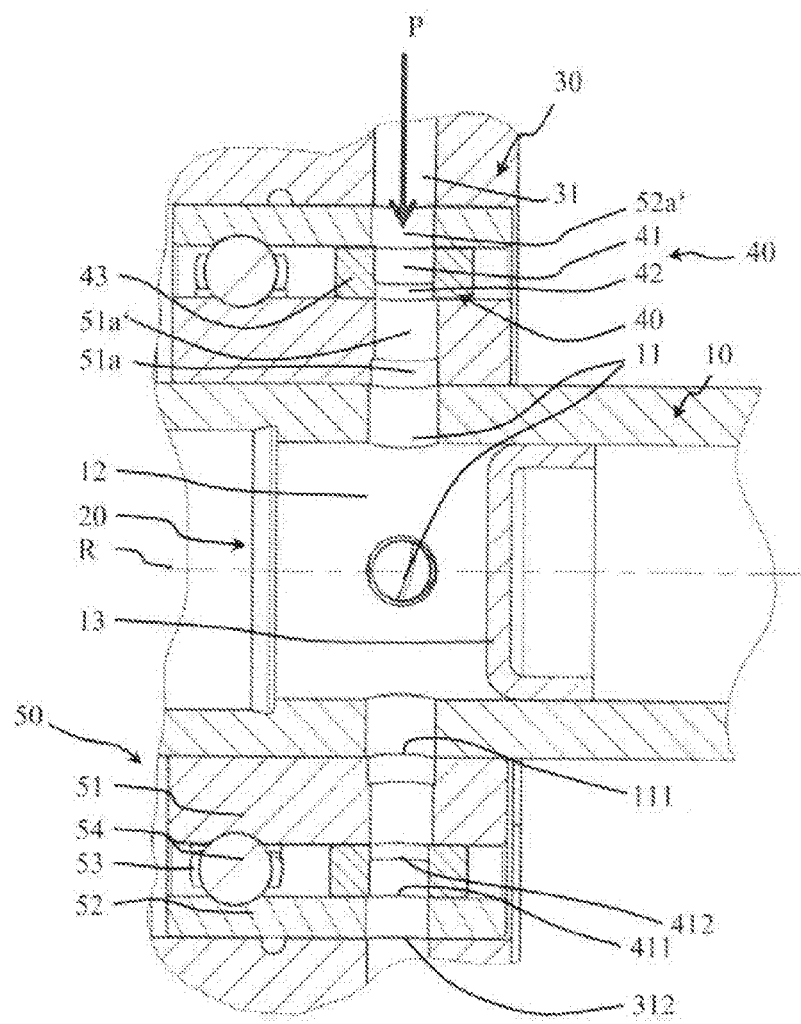
FIG. 7 shows a schematic cross section of a seventh specific embodiment, which includes a pressure medium transfer element situated between the rolling bearing inner ring and the rolling bearing outer ring, with an annular base body.
Figure 8:
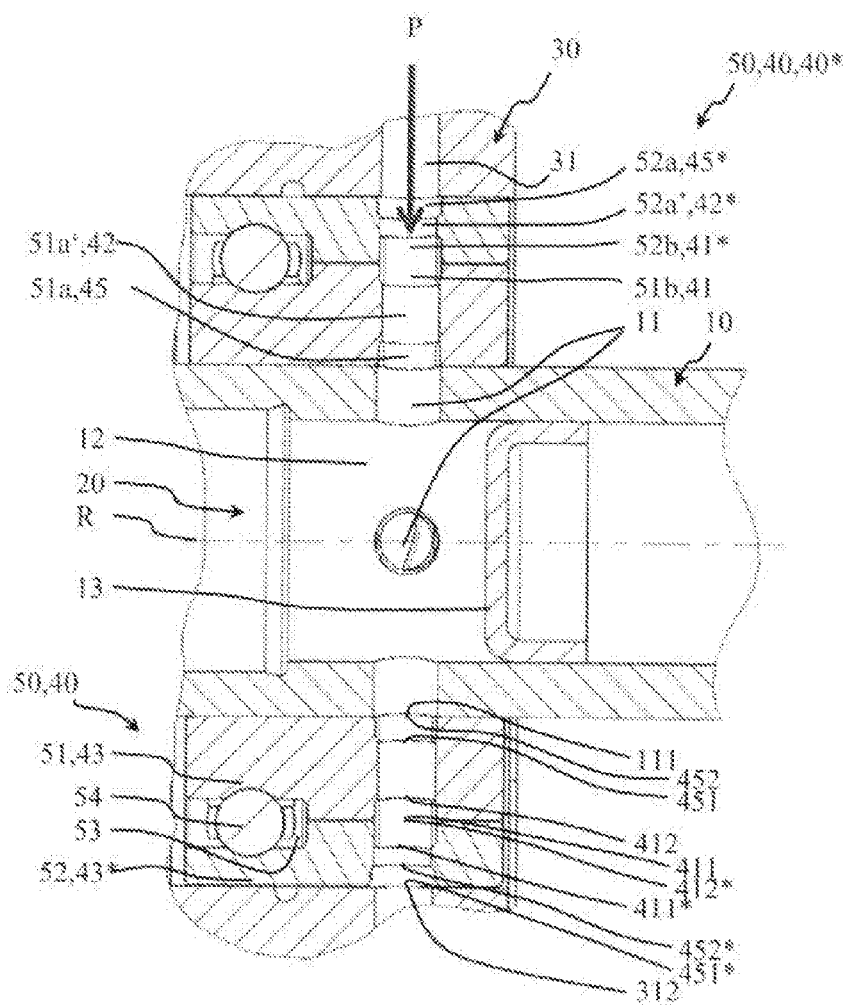
FIG. 8 shows a schematic cross section of an eighth specific embodiment, which includes two pressure medium transfer elements integrated into the rolling bearing inner ring or into the rolling bearing outer ring.
Figure 9:
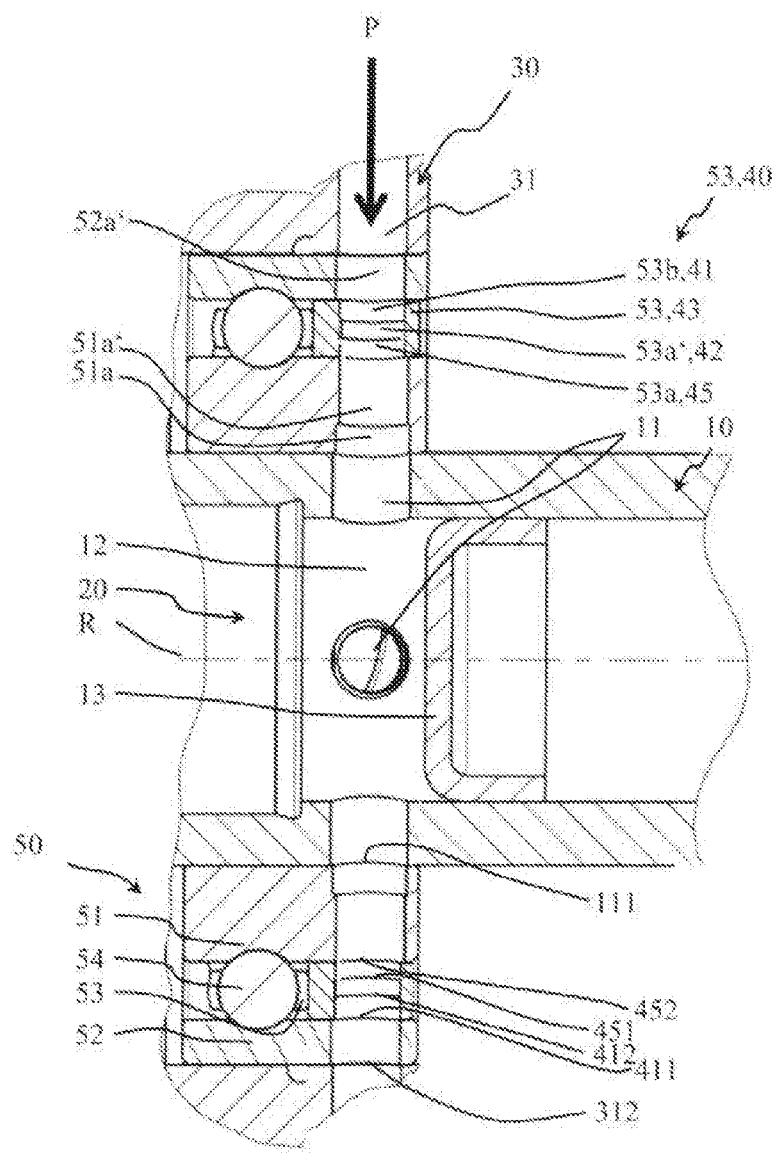
FIG. 9 shows a schematic cross section of a ninth specific embodiment, which includes a pressure medium transfer element situated between the rolling bearing inner ring and the rolling bearing outer ring and integrated into the rolling bearing cage ring.

Within the scope of the specific embodiments illustrated in FIGS. 7 through 9, rolling bearing 50 is designed, as in the specific embodiment illustrated in FIG. 3, to transfer hydraulic pressure medium P from a stationary component 30 to a rotatable component 10 and includes one or multiple channels for conducting hydraulic pressure medium P. To conduct pressure medium P past the ball cage of rolling bearing 50 and not through it, rolling bearing inner ring 51 and rolling bearing outer ring 52 and possibly also the rolling bearing ball cage ring have an axially elongated design.

Within the scope of the specific embodiment illustrated in FIG. 7, rolling bearing 50 includes not only rolling bearing inner ring 51, rolling bearing outer ring 52 and rolling bearing ball cage ring 53 with rolling bearing balls 54 situated therein, but also a pressure medium transfer element 40, which includes an annular channel 41 having a radially outer annular channel opening 411 extending in the circumferential direction of annular channel 41 and multiple radially inner radial channel openings 412 opposite annular channel opening 411 as well as multiple radial channels 42 which each empty into one of radial channel openings 412 of annular channel 41.

Pressure medium transfer element 40 is an independent, annular component or component arrangement which may have, for example, an annular base body 43 provided with an annular groove or an annular base body 43 in the form of an annular U profile.

FIG. 7 shows that pressure medium transfer element 40 is situated between rolling bearing inner ring 51 and roller bearing outer ring 52. In the specific embodiment illustrated in FIG. 7, pressure medium transfer element 40 is fastened in particular via its inner lateral surface to roller bearing inner ring 51, in particular its lateral surface. However, it is also possible to fasten pressure medium transfer element 40 to a different component of rolling bearing 50, for example rolling bearing outer ring 52 or rolling bearing ball cage ring 53, or to situate pressure medium transfer element 40, loosely or floatingly supported, between rolling bearing inner ring 51 and rolling bearing outer ring 52 (not illustrated), whereby pressure medium transfer element 40 should then have a different design.

For the purpose of fastening to the rolling bearing outer ring, the pressure medium transfer element may have, for example, a reversed design and include an annular channel having a radially inner annular channel opening extending in the circumferential direction of the annular channel and multiple radially outer radial channel openings opposite the annular channel opening as well as multiple radial channels which each empty into one of the radial channel openings (not illustrated).

For the purpose of fastening to the rolling bearing ball cage ring or for a loose or floatingly supported arrangement, the pressure medium transfer element may include, for example, an annular channel having a radially inner annular channel opening extending in the circumferential direction of the annular channel and multiple radially outer radial channel openings, an annular channel having a radially outer annular channel opening extending in the circumferential direction of the annular channel as well as multiple radial channels which each connect the annular channel having the radially outer annular channel opening to the annular channel having the radially inner annular channel opening (not illustrated). In a loose or floatingly supported arrangement, the position of pressure medium transfer element 40 may be secured or blocked radially by the rolling bearing inner ring and the rolling bearing outer ring and axially by the rolling bearing ball cage ring and/or the rolling bearing inner ring and/or the rolling bearing outer ring and/or, if necessary, one or multiple additional components (not illustrated).

Within the scope of the specific embodiment illustrated in FIG. 7, rolling bearing outer ring 52 includes a radial channel 52a' and rolling bearing inner ring 51 includes multiple radial channels 51a' which empty radially into an annular channel 51a of rolling bearing inner ring 51. Radial channel 52a' of rolling bearing outer ring 52 empties radially into annular channel 41 of pressure medium transfer element 40, which, in turn, empties into radial channels 42 of pressure medium transfer element 40, which, in turn, empty into radial channels 51a' of rolling bearing inner ring 51. In this way, radial channel 52a' of rolling bearing outer ring 52 communicates with radial channels 51a' of rolling bearing inner ring 51 via pressure medium transfer element 40, in particular via annular channel 41 and radial channels 42 of pressure medium transfer element 40.

FIG. 7 furthermore shows that pressure medium channel 31 of cylinder head-affixed component 30 empties radially into radial channel 52a' of rolling bearing outer ring 52. Annular channel 51a of rolling bearing inner ring 51 empties into radial channels 11 of camshaft 10. In this way, pressure medium channel 31 communicates with radial channels 11 of camshaft 10 via radial channel 52a' of rolling bearing outer ring 52 and via pressure medium transfer element 40, in particular via annular channel 41 and radial channels 42 of pressure medium transfer element 40 and via radial channels 51a' and annular channel 51a of rolling bearing inner ring 51. A pressure medium transfer from stationary pressure medium channel 31 of cylinder head-affixed component 30 to rotatable radial channels 11 of camshaft 10 may thus be advantageously implemented.

Within the scope of the embodiment illustrated in FIG. 7, annular channel 51a of rolling bearing inner ring 51 is used, in particular, to avoid an angle-oriented alignment of rolling bearing inner ring 51 with respect to radial channels 11 of camshaft 10 during mounting and makes it possible to advantageous simplify the mounting of rolling bearing inner ring 51 onto camshaft 10.

In the specific embodiment illustrated in FIG. 7, however, pressure medium transfer element 40 should be mounted in an angle-oriented manner with respect to radial channels 51a' of rolling bearing inner ring 51 on rolling bearing inner ring 51, and roller bearing outer ring 52 should be mounted in an angle-oriented manner with respect to pressure medium channel 31 of cylinder head-affixed component 30.

To avoid these angle orientations as well or to increase their tolerance range (not illustrated), a (mounting) annular channel and/or a (mounting) radial channel having a radial channel opening enlarged axially and/or in the circumferential direction may be formed between the radial channel of the pressure medium transfer element and the radial channel of the rolling bearing inner ring and/or between the radial channel of the rolling bearing outer ring and the pressure medium channel, which may be formed, for example in the pressure medium transfer element or the rolling bearing inner ring or in the rolling bearing outer ring or the cylinder head-affixed component. An angle-oriented mounting may be avoided with the aid of a (mounting) annular channel. With the aid of a (mounting) radial channel having a radial channel opening which is enlarged axially and/or in the circumferential direction, in particular compared to the adjacent openings, at least the tolerance range of the angle orientation may be advantageously increased and the mounting simplified thereby.

Within the scope of the specific embodiment illustrated in FIG. 7, a sealing of the pressure medium transfer system may be implemented with the aid of a clearance fit between pressure medium transfer element 40 and rolling bearing outer ring 52. However, it is also conceivable to implement a seal with the aid of sealing rings or a compression seal.

FIG. 8 shows another specific embodiment, in which a pressure medium transfer element 40, 40* is integrated into rolling bearing inner ring 51 and into rolling bearing outer ring 52. In other words, both rolling bearing inner ring 51 and rolling bearing outer ring 52 are used as a pressure medium transfer element 40, 40*.

Rolling bearing inner ring 51 includes an annular channel 51b, 41 having a radially outer annular channel opening 411 and multiple radially inner radial channel openings 412, an inner annular channel 51a, 45 having a radially inner annular channel opening 452 and multiple radially outer radial channel openings 451 as well as multiple radial channels 51a', 42, which 51a', 42 connect annular channel 51b, 41 having radially outer annular channel opening 411 of rolling bearing inner ring 51 to annular channel 51b, 45 having radial outer annular channel opening 451 of rolling bearing inner ring 51. Radial channels 51a', 42 of rolling bearing inner ring 51 each empty into a radially inner radial channel opening 412 of annular channel 51b, 41 having radially outer annular channel opening 411 of rolling bearing inner ring 51 and into a radially outer radial channel opening 451 of annular channel 51a, 45 having radially outer annular channel opening 411 of rolling bearing inner ring 51.

Rolling bearing outer ring 52 also includes an annular channel 52a, 45* having a radially outer annular channel opening 451* and multiple radially inner radial channel openings 452*, an inner annular channel 52b, 41* having a radially inner annular channel opening 412* and multiple radially outer radial channel openings 411* as well as multiple radial channels 52a', 42*, which connect annular channel 52a, 45* having radially outer annular channel opening 451* of rolling bearing outer ring 52 to annular channel 52b, 41* having radially inner annular channel opening 412* of rolling bearing outer ring 52. Radial channels 52a', 42* of rolling bearing outer ring 52 each empty into a radial inner radial channel opening 452* of annular channel 52a, 45* having radially outer annular channel opening 451* of rolling bearing outer ring 52 and into a radially outer radial channel opening 411* of annular channel 52b, 41* having radially inner annular channel opening 412* of rolling bearing outer ring 52.

Rolling bearing inner ring 51 and rolling bearing outer ring 52 have an axially elongated design with respect to rolling bearing ball cage ring 53, rolling bearing inner ring 51 and rolling bearing outer ring 52 being directly adjacent to and opposite each other in the sections designed for pressure medium transfer and, in particular, rolling bearing ball cage ring 53 not extending between the sections of rolling bearing inner ring 51 and rolling bearing outer ring 52 designed for pressure medium transfer.

Within the scope of the specific embodiment illustrated in FIG. 8, a sealing of the pressure medium transfer system may be implemented, in particular, with the aid of a clearance fit between surfaces facing one another of rolling bearing inner ring 51 and rolling bearing outer ring 52.

Radially inner annular channel opening 412* of annular channel 52b, 41* of rolling bearing outer ring 52 is directly adjacent to and opposite radially outer annular channel opening 411 of annular channel 51b, 41 of rolling bearing inner ring 51.

As a result, inner annular channel 52b, 41* of rolling bearing outer ring 52 empties radially into outer annular channel 51b, 41 of rolling bearing inner ring 51. Since outer annular channel 52a, 45* of rolling bearing outer ring 52 empties into inner annular channel 52b, 41* of rolling bearing outer ring 52 via radial channels 52a', 42* of rolling bearing outer ring 52, and outer annular channel 51b, 41 of rolling bearing inner ring 51 empties into inner annular channel 51a, 45 of rolling bearing inner ring 51 via radial channels 51a', 42 of rolling bearing inner ring 51, outer annular channel 52a, 45* of rolling bearing outer ring 52 may communicate with inner annular channel 51a, 45 of rolling bearing inner ring 51 in this way.

FIG. 8 furthermore shows that pressure medium channel 31 of cylinder head-affixed component 30 empties radially into outer annular channel 52a, 45* of rolling bearing outer ring 52, a radially inner opening 312 of pressure medium channel 31 being situated opposite, in particular, directly adjacent to, radially outer annular channel opening 411 of outer annular channel 52a, 45* of rolling bearing outer ring 52. Inner annular channel 51a, 45 of rolling bearing inner ring 51 empties into radial channels 11 of camshaft 10, radially inner annular channel opening 452 of inner annular channel 51a, 45 of rolling bearing inner ring 51 being situated opposite, in particular directly adjacent to, radially outer openings 111 of radial channels 11 of camshaft 10. In this way, pressure medium channel 31 communicates with radial channels 11 of camshaft 10 via annular channels 52a, 45*;52b, 41* and radial channels 52a', 42* of rolling bearing outer ring 52 and annular channels 51b, 41; 51a, 45 and radial channels 51a', 42 of rolling bearing inner ring 51. A pressure medium transfer from stationary pressure medium channel 31 of cylinder head-affixed component 30 to rotatable radial channels 11 of camshaft 10 and, in particular to rotatably situated phase setting device 20, may thus be advantageously implemented.

Within the scope of the embodiment illustrated in FIG. 8, outer annular channel 52a, 45* of rolling bearing outer ring 52 and inner annular channel 51a, 45 of the rolling bearing inner ring are used, in particular, to avoid an angle-oriented alignment of rolling bearing outer ring 52 with respect to pressure medium channel 31 or of rolling bearing inner ring 51 with respect to radial channels 11 of camshaft 10 during mounting and make it possible to advantageous simplify the mounting of rolling bearing outer ring 52 on cylinder head-affixed component 30 and of rolling bearing inner ring 51 on camshaft 10.

The specific embodiment illustrated within the scope of FIG. 9 essentially differs from the specific embodiment illustrated within the scope of FIG. 7 due to the fact that pressure medium transfer element 40 is fastened to rolling bearing ball cage ring 53 or is integrated therein 53. Rolling bearing ball cage ring 53 may be fastened to rolling bearing inner ring 51 or to rolling bearing outer ring 52 as well as loosely or floatingly supported or rotatably situated with respect to rolling bearing inner ring 51 and with respect to rolling bearing outer ring 52.

For this reason or—as explained in greater detail in connection with FIG. 7—to avoid an angle-oriented mounting, the specific embodiment illustrated in FIG. 9 also differs from the specific embodiment illustrated in FIG. 7 due to the fact that pressure medium transfer element 40 or rolling bearing ball cage ring 53 includes not only one, in particular outer, annular channel 41 but also two annular channels 53b, 41; 53a, 45, namely one outer annular channel 53b, 41 and one inner annular channel 53a, 45, which are connected to each other via radial channels 53a', 42. Pressure medium transfer element 40 or rolling bearing ball cage ring 53 includes, in particular, an outer annular channel 53b, 41 having a radially outer annular channel opening 411 and multiple radially inner radial channel openings 412, an inner annular channel 53a, 45 having a radially inner annular channel opening 452 and multiple radially outer radial channel openings 451 as well as multiple radial channels 53a', 42, which 42 connect outer annular channel 53b, 41 having radially outer annular channel opening 411 to inner annular channel 53a, 45 having radial inner annular channel opening 452. Radial channel 52a' of the rolling bearing outer ring empties radially into outer annular channel 53b, 41 of pressure medium transfer element 40 or of rolling bearing ball cage ring 53, inner annual channel 53a, 45 of pressure medium transfer element 40 or of rolling bearing ball cage ring 53 emptying radially into radial channels 51a' of rolling bearing inner ring 51.

LIST OF REFERENCE NUMERALS

10 Camshaft
11 Radial channel
111 Radially outer radial channel opening
12 Camshaft interior
13 Closing element
14 Annular channel
15 Sealing ring
16 Sealing ring receptacle
20 Hydraulic phase setting device
30 Cylinder head-affixed component, in particular cylinder head
31 Pressure medium channel
312 Radially inner pressure medium channel opening
32 Compression sealing contact and accommodating section
40,40* Pressure medium transfer element
41,41* Annular channel
411 Radially outer annular channel opening
411* Radially outer radial channel opening
412 Radially inner radial channel opening
412* Radially inner annular channel opening
42,42* Radial channel
43 Annular base body
44 Sealing ring
45,45* Annular channel
451 Radially outer radial channel opening
451* Radially outer annular channel opening
452 Radially inner annular channel opening
452* Radially inner radial channel opening
46 Sealing ring receptacle
50 Rolling bearing
51 Rolling bearing inner ring
52 Rolling bearing outer ring
53 Rolling bearing ball cage ring
54 Rolling bearing ball
51a,52a,53a Annular channel
51a',52a',53a' Radial channel
51b,52b,53b Annular channel
51c Sealing ring
51d Sealing ring receptacle
P Pressure medium
R Rotation axis of the camshaft

What is claimed is:

1. A camshaft assembly comprises:
a camshaft having at least one radial channel;
a hydraulic phase setting device communicating with the at least one radial channel and for adjusting a phase angle of the camshaft with respect to a crankshaft with the aid of a hydraulic pressure medium; and
a pressure medium channel provided in a cylinder head-affixed component;
at least one pressure medium transfer element formed between the pressure medium channel and the at least one radial channel of the camshaft;
the at least one pressure medium transfer element including at least one annular channel having an annular channel opening extending in a circumferential direction of the annular channel, and at least one radial channel opening opposite the annular channel opening and emptying into a further radial channel;
the pressure medium channel communicating with the at least one radial channel of the camshaft via the annular channel opening and the at least one radial channel opening of the at least one annular channel of the at least one pressure medium transfer element.

2. The camshaft assembly as recited in claim 1 wherein the at least one pressure medium transfer element includes the further radial channel, the further radial channel emptying into the radial channel opening of at least one annular channel of the at least one pressure medium transfer element.

3. The camshaft assembly as recited in claim 1 wherein the annular channel opening is a radially outer annular channel opening.

4. The camshaft assembly as recited in claim 1 wherein the at least one pressure medium transfer element includes the at least one annular channel having a radially outer annular channel opening, an annular channel having a radially inner annular channel opening, as well as at least one radial channel connecting the radial channel having the radially outer annular channel opening to the annular channel having the radially inner annular channel opening.

5. The camshaft assembly as recited in claim 4 further comprising a second pressure medium transfer element, the radially inner annular channel opening of the annular channel of the at least one pressure medium transfer element being situated opposite a radially outer annular channel opening of the annular channel of the second pressure medium transfer element.

6. The camshaft assembly as recited in claim 4 further comprising a second pressure medium transfer element, the radially inner annular channel opening of the annular channel of the at least one pressure medium transfer element being situated directly adjacent to a radially outer annular channel opening of the annular channel of the second pressure medium transfer element.

7. The camshaft assembly as recited in claim 1 wherein the at least one pressure medium transfer element includes an annular base body in the form of an annular U profile or H profile having an essentially axially oriented profile middle section, at least one radial channel extending through the profile middle section, or the at least one pressure medium transfer element including an annular base body, the at least one annular channel provided in the annular base body in the form of an annular groove, at least one radial channel extending through the annular base body and emptying into the at least one annular groove-shaped annular channel.

8. The camshaft assembly as recited in claim 1 wherein the at least one pressure medium transfer element includes at least two sealing rings extending on both sides of an annular channel.

9. The camshaft assembly as recited in claim 8 wherein the at least one pressure medium transfer element includes an annular base body including two sealing ring receptacles formed on both sides of the annular channel for the purpose of accommodating the sealing rings.

10. The camshaft assembly as recited in claim 1 wherein an annular base body of the at least one pressure medium transfer element functions as a compression seal, the annular base body being pressable against an adjacent component to be sealed with respect to the annular base body for the purpose of achieving a sealing effect upon the application of pressure medium and, upon the deformation of the annular base body.

11. The camshaft assembly as recited in claim 1 wherein the at least one pressure medium transfer element is sealed against one or multiple adjacent components to be sealed with respect to the at least one pressure medium transfer element with the aid of one or multiple clearance fits.

12. The camshaft assembly as recited in claim 1 wherein the at least one pressure medium transfer element is connected to the camshaft or a rolling bearing inner ring or is integrated therein, the pressure medium channel emptying into an annular channel of the pressure medium transfer element via an annular channel opening; or the at least one pressure medium transfer element is connected to the cylinder head-affixed component or a rolling bearing outer ring or is integrated therein, the at least one radial channel of the camshaft emptying into an annular channel of the at least one pressure medium transfer element via an annular channel opening; or the at least one pressure medium transfer element is a floatingly supported pressure medium transfer element including two annular channels connected to each other via at least one radial channel, the pressure medium channel emptying into one of the annular channels of the at least one pressure medium transfer element via an annular channel opening, and the at least one radial channel of the camshaft emptying into the other annular channel of the pressure medium transfer element via an annular channel opening.

13. The camshaft assembly as recited in claim 1 wherein the at least one pressure medium transfer element is fastened to an outer lateral surface of the camshaft or of a rolling bearing inner ring or integrated therein, or the at least one pressure medium transfer element is fastened to an inner lateral surface of the cylinder head-affixed component or a rolling bearing outer ring or integrated therein, or the at least one pressure medium transfer element is fastened to a rolling bearing ball cage ring or integrated therein.

* * * * *